UNITED STATES PATENT OFFICE.

D. E. SOMES, OF BIDDEFORD, MAINE, ASSIGNOR TO JAMES S. ANDERSON.

IMPROVEMENT IN CURING PROVISIONS.

Specification forming part of Letters Patent No. 30,658, dated November 13, 1860; Reissue No. 1,097, dated December 11, 1860.

*To all whom it may concern:*

Be it known that I, DANIEL E. SOMES, of Biddeford, in the county of York and State of Maine, have invented or discovered a new and useful Mode of Curing Meats and Flesh in Different Latitudes; and I do hereby declare that the following is a full, clear, and exact description of my discovery.

The nature of my invention consists in the use and employment of shafts or excavations in the earth, constructed and arranged in the manner hereinafter described, in which the temperature of the atmosphere is maintained at a degree sufficiently cold for the salting and curing of meats and other articles of food.

It is a well-known fact that the mean temperature of the earth in any climate may be reached by sinking shafts in the earth. It is also a well-known fact that different species of animal-flesh may be cured at degrees ranging from 40° to 50° Fahrenheit, or thereabout. In view of these facts I propose that where a sufficiently-low temperature cannot be found by simply sinking a shaft, to surround the shaft with a casing or jacket filled with salt and ice or other cooling-mixture, and in addition to use large vats containing similar mixtures. These shafts are designed to be made sufficiently large for packing-houses, into which the articles to be cured are lowered and there salted and allowed to remain until cured for market. Walls should be erected around these shafts to protect them from the warm air above. Hides may be cured by the same process.

What I claim as new, and desire to secure by Letters Patent, is—

Salting and curing food and hides in any latitude and at times when the temperature at the surface of the earth is too high for the ordinary process, by means of operating in excavations or shafts made in the earth to a depth sufficient to attain the mean temperature of the earth, or to a depth at which meats have not heretofore been salted and cured, and, further, to cool by artificial refrigeration, substantially as set forth.

D. E. SOMES.

Witnesses:
C. M. ALEXANDER,
S. W. WYVILL.